US011279390B2

(12) United States Patent
Dalton

(10) Patent No.: US 11,279,390 B2
(45) Date of Patent: Mar. 22, 2022

(54) ATTACHMENT FOR A PUSHABLE DEVICE

(71) Applicant: StrollRunner, LLC, Williston, VT (US)

(72) Inventor: Heather Dalton, Williston, VT (US)

( * ) Notice: Subject to any disclaimer, the term of this patent is extended or adjusted under 35 U.S.C. 154(b) by 0 days.

(21) Appl. No.: 17/188,639

(22) Filed: Mar. 1, 2021

(65) Prior Publication Data

US 2021/0188340 A1    Jun. 24, 2021

Related U.S. Application Data

(63) Continuation-in-part of application No. PCT/US2019/049269, filed on Sep. 3, 2019.

(60) Provisional application No. 62/726,252, filed on Sep. 1, 2018.

(51) Int. Cl.
*B62B 9/20* (2006.01)

(52) U.S. Cl.
CPC ............ *B62B 9/20* (2013.01); *B62B 2202/42* (2013.01)

(58) Field of Classification Search
CPC ........... B62B 9/20; B62B 9/203; B62B 9/206; B62B 2202/42; B60B 33/02; B60B 33/025

See application file for complete search history.

(56) References Cited

U.S. PATENT DOCUMENTS

| 5,873,175 A | 2/1999 | Johnston | |
|---|---|---|---|
| 6,349,949 B1 * | 2/2002 | Gorringe | B62B 5/068 280/1.5 |
| 6,871,380 B2 * | 3/2005 | Chen | B60B 1/006 16/19 |
| 7,007,956 B1 * | 3/2006 | Pinon | B62B 5/068 224/184 |
| 7,311,313 B1 | 12/2007 | Ray et al. | |
| 9,751,363 B2 * | 9/2017 | Degrace | B60B 33/02 |
| D825,400 S | 8/2018 | Hanson et al. | |
| 2006/0108756 A1 * | 5/2006 | Kerr | B62B 5/068 280/33.992 |

(Continued)

OTHER PUBLICATIONS

Young, "International Search Report and Written Opinion", regarding PCT Application No. PCT/US19/49269, dated Dec. 30, 2019.

*Primary Examiner* — John D Walters
(74) *Attorney, Agent, or Firm* — Shawn Gordon, Esq.; Dunkiel Saunder Elliott Raubvogel & Hand, PLLC

(57) ABSTRACT

An attachment for pushable devices, such as strollers, carts, wagons, wheelchairs, and the like, fits between a jogger or walker and a pushable device and allows for more natural running or walking motion while pushing the device. In some embodiments, the attachment includes dampening functions to smooth the connection between the pusher and device, which, in conjunction with an overall geometry that limits interference with the pusher's walking or running motion, provides a smoother ride for an occupant and/or contents of the device. In other embodiments, the attachment provides a substantially rigid connection between the device and the user. The attachments allow the pusher's movement to help steer the device, and, while allowing for mostly hands-free use, reduce unwanted movements translated into the device from the pusher's motions. The attachments described herein allow pushers to comfortably run/jog/walk hands-free while pushing the device in front of them.

14 Claims, 17 Drawing Sheets

(56) References Cited

U.S. PATENT DOCUMENTS

| | | | |
|---|---|---|---|
| 2007/0187910 A1* | 8/2007 | Adams | B62B 5/068 280/1.5 |
| 2008/0238024 A1 | 10/2008 | Heidenreich et al. | |
| 2008/0296326 A1 | 12/2008 | Berlin et al. | |
| 2018/0178824 A1* | 6/2018 | Hanson | B62B 7/126 |

* cited by examiner

ATTACHMENT FOR A PUSHABLE DEVICE

FIELD OF THE INVENTION

The present invention generally relates to accessories for pushable devices. In particular, the present invention is directed to an Attachment for a Pushable Device.

BACKGROUND

Presently available jogging strollers generally cause the user—the jogger pushing the stroller—to break their natural running or walking rhythm as the user must (at least semi-frequently if not continuously) push the jogging stroller in a desired direction and at a desired rate directly with one or both hands, forearms, or other body part. Some strollers attempt to overcome this issue by extending the geometry of the stroller to allow for fuller leg strides, but natural arm swing is still not possible when maintaining contact with the stroller. Thus, by maintaining direct contact with the stroller with a body part, a jogger is unable to freely swing their arms in movement with their legs during their running or walking routine. Running, jogging, and walking, therefore, becomes difficult, tedious, and potentially injurious when the natural movement of the user's arms and legs is interrupted.

Some users attempt to overcome the lack of natural motion by "letting-go" of the stroller for periods of time, e.g., pushing the stroller ahead and catching up to it as it slows down. However, this can result in the stroller accelerating faster than the user (e.g., rolling uncontrollably down a hill), the stroller tipping over, the stroller becoming unstable on certain surfaces (e.g., loose gravel or dirt), or the stroller tripping the user when contact resumes. With the safety of a child in the stroller being paramount, the disadvantages and discomfort caused by the interruption of a user's stride has driven many users away from jogging while pushing a stroller altogether.

Attachments for jogging strollers have been developed, which allow users to remove their hands or forearms from a handle or grip of the stroller. These attachments can allow for a more natural walking or running motion and stride. However, the continuous rolling motion of the stroller can be out of step with the walking/running motion of the pusher, resulting in jarring effects for both the pusher and the stroller occupant. Moreover, such attachments do not allow for natural steering of the stroller while the user removes their hands from the stroller, hindering the full running experience. Therefore, there is a need for an improved hands-free attachment for a stroller.

SUMMARY OF THE DISCLOSURE

In an embodiment, an attachment for hands-free pushing of a pushable device includes a push arm assembly having a connector portion and a first tube, wherein the connector portion has a first side and an opposing side, wherein the first tube is coupled to the connector portion on the opposing side and projects away from the first side of the connector portion. A handle engagement member is coupled to the first side, a user assembly connector has a second tube and a user engagement portion, wherein the second tube slidably connects with the first tube. The user engagement portion has a first portion, a right curved part coupled to the first portion, and a left curved part coupled to the first portion, wherein the first portion engages with a front part of a waist of a pusher, the right curved part engages with at least a part of the pusher's right side, and the left curved part designed to engage with at least a part of the pusher's left side. The second tube projects away from the user engagement portion. A user assembly has a left support and a right support, wherein the right support releasably attaches the right curved part to the user assembly and the left support releasably attaches the left curved part to the user assembly, wherein the first tube and the second tube provide the only connection between the push arm assembly and the user assembly connector.

In another embodiment, an apparatus for hands-free pushing of a pushable device includes a handle attachment for attaching to the pushable device that has a push arm assembly and a user assembly connector. The user assembly connector has a first portion designed to engage with a front part of a waist of a pusher, a first curved part designed to engage with at least a part of one side of the pusher, and a second curved part designed to engage with at least a part of an opposite side of the pusher. A connector connects the push arm assembly to the user assembly connector and a user assembly is designed and configured to releasably receive and attach to the user assembly connector, wherein the push arm assembly, the connector, and the user assembly connector form a rigid connection between the pushable device and the pusher when connected.

In another embodiment, an attachment for hands-free pushing of a pushable device includes a push arm assembly having a handle engagement member and a first tube and a user assembly connector having a second tube and a user engagement portion, wherein the second tube is designed to connect to the first tube, wherein the user engagement portion includes a user assembly connector on a pusher side, the user assembly connector including a first portion designed to engage with a front part of a waist of a pusher, a right curved part designed to engage with at least a part of the pusher's right side, and a left curved part designed to engage with at least a part of the pusher's left side, and wherein the second tube is connected to the user engagement portion opposite the pusher side and projects away from the user engagement portion.

In another embodiment, an attachment for a pushable device includes a push arm assembly and a pusher engagement member having a first portion, a first curved part, and a second curved part, wherein the first portion is designed to engage with a front part of a waist of a pusher, wherein the first curved part is designed to engage with at least a part of one side of the pusher, and wherein the second curved part designed to engage with at least a part of an opposite side of the pusher. A connector connects the push arm assembly to the pusher engagement member, wherein the push arm assembly, the connector, and the pusher engagement member form a rigid connection between the pushable device and the pusher when connected.

In another embodiment, a method for allowing hands-free operation of a pushable device includes attaching a push arm assembly to the pushable device, the push arm assembly being attached to a connector, wherein the connector is attached to a user assembly connector, attaching the user assembly connector to a user assembly, securing the user assembly around a user's waist, and adjusting a length of the connector based on a preference of the user. The push arm assembly, the connector, and the user assembly connector form a rigid connection between the pushable device and the user.

In another embodiment, an attachment device is provided for use by a pusher of a pushable device, the pusher having a user connector around the waist of the pusher, the pusher including a plurality of attachment portions. The attachment device includes a push arm assembly having a proximate end and a distal end, a user assembly connector coupled to the push arm assembly at the proximate end and coupled to the user connector at the plurality of attachment portions, and a handle connector coupled to the push arm assembly at the distal end.

In another embodiment, a wearable user assembly is provided for connecting an attachment device, used to push a pushable device, to a pusher, the attachment device including a pusher engagement member having a first portion, a first curved part, and a second curved part, wherein the first portion is designed to engage with a front part of a waist of the pusher, wherein the first curved part is designed to engage with at least a part of one side of the pusher, and wherein the second curved part designed to engage with at least a part of an opposite side of the pusher. The wearable user assembly includes a front portion including a first and second attachment portions, the first and second attachment portions sized and configured to accept a respective one of the first curved part and the second curved part, and wherein the first and second attachment portions secure the first curved part and the second curved part proximate the waist of the user, and a rear portion, the rear portion being adjustable so as to secure the wearable user assembly connector to the pusher.

In another embodiment, a method of pushing a pushable device includes securing an attachment device to the pushable device, the attachment device including a first tube and a second tube, the first tube nestable within the second tube so as to create single rod between a pusher and the pushable device, connecting the attachment device to the pusher, and adjusting the distance between the pusher and the pushable device by moving the first tube relative to the second tube so as to lengthen or shorten the single rod.

In another embodiment, an attachment for hands-free pushing of a pushable device includes an aim assembly having a device side and a user side. The arm assembly includes a push arm connector assembly on the pushing device side, the push arm assembly including a plurality of handle engagement members configured to engage with a handle of the pushable device and a device-side engagement member. The arm assembly further includes a user connector assembly on the user side including a user-side engagement member and a user engagement member, wherein the user engagement member is rigid, curves inward with respect to a user, and extends horizontally sufficiently to engage with a substantial portion of a front of the user when attached to the user. The device-side engagement member and the user-side engagement member are configured to be secured together with a selected amount of overlap between the device-side engagement member and the user-side engagement member.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

Figure 1:
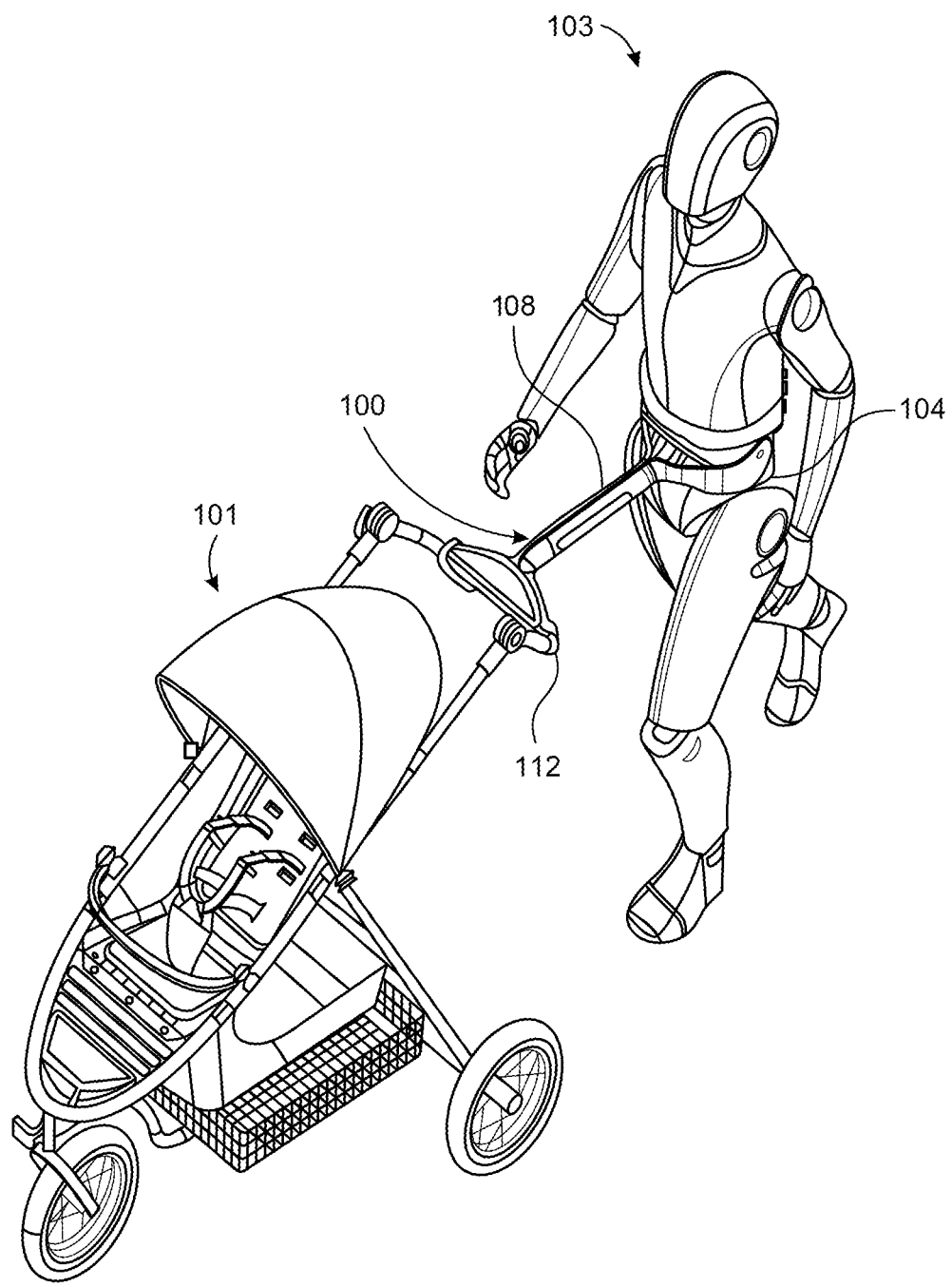
FIG. 1 is a perspective view of an attachment for a pushing device, shown in use with a stroller according to an embodiment of the present invention.

An attachment for a pushable device of the present invention connects a jogger or walker (referred to herein as a "pusher" or "user") to a pushable device, which may include, as used herein, any similar rolling device to be pushed by a user, such as a stroller, and allows for a natural running or walking motion while pushing the device in front of the user. In some embodiments disclosed herein, the attachment includes dampening functions to react to the independent movements of the pusher and device, which, in conjunction with an overall geometry that limits interference with the natural gait of a pusher's arms and stride, results in more natural motion for the pusher and a smoother ride for an occupant and/or contents of the device. In another embodiment, the attachment provides a pivotable substantially rigid connection between the pushable device and the user. (As used herein, rigid means that a component or connected components do not significantly distort under forces typically involved by a user pushing a stroller at a walking or running pace on typical surfaces such as asphalt, concrete, gravel, dirt roads, etc.) Embodiments of an attachment disclosed herein allow the pusher's body movements to steer the device, and, while allowing for substantially hands-free control of the device, also reduce unwanted movements, such as body movements that could result in the front of the device bouncing, being translated into the device from the pusher's motions. Embodiments of the attachments disclosed herein allow pushers to comfortably run/jog/walk hands-free while keeping control of a pushable device in front of them.

Turning now to the figures, and in particular, FIGS. 1 to 4, an embodiment of an attachment, attachment 100, is shown. In this embodiment, attachment 100 securely mounts to a pushable device, such as stroller 101, and couples to a pusher 103 proximate the hips of the pusher. At a high level, attachment 100 includes a user assembly 104, an arm assembly 108, and a stroller mount 112. The combination of user assembly 104, arm assembly 108, and stroller mount 112 allow for natural movement of pusher 103 while walking or jogging and for constant control over stroller 101, thereby ensuring the safety of the occupant of the stroller.

Figure 2:
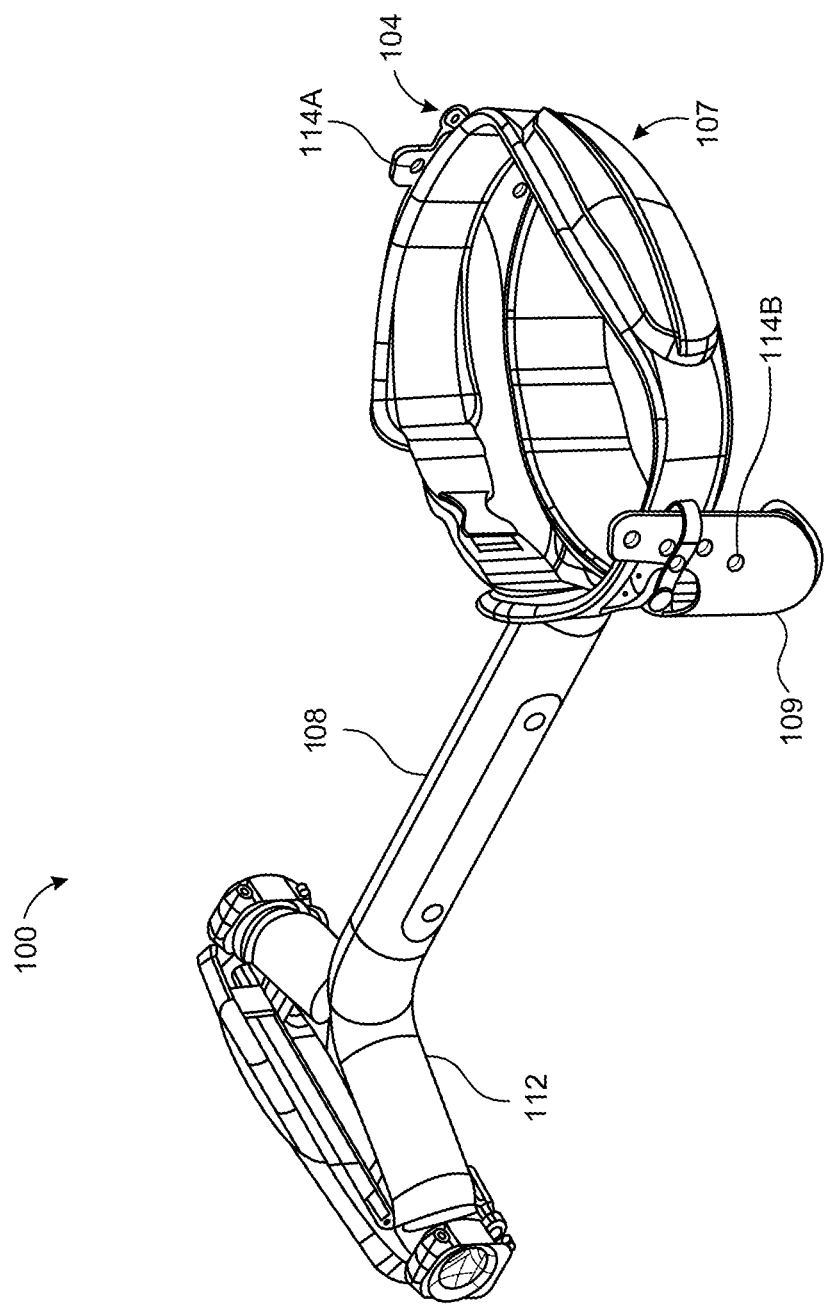
FIG. 2 is a perspective view of an attachment for a stroller in accordance with an embodiment of the present invention.

An embodiment of a user assembly 104 is shown in FIG. 2. In general, user assembly 104 is configured to sit high on the waist of pusher 103, typically above the belt-line. User assembly 104 allows for a flexible, yet firm connection to arm assembly 108; is readily removable from pusher 103 when desired; and provides a stable pivot point for arm assembly 108. User assembly 104 is preferably designed and configured to fit a wide variety of users via the inclusion of an adjustable connection system 202, e.g., a squeeze buckle and adjustable straps as shown in the embodiment of user assembly 204 shown in FIG. 6. Adjustable connection system 202 can take on other configurations and connection mechanisms, such as, but not limited to, hook and loop fastening systems, snaps, belts, and the like. In an embodiment, user assembly 104 includes apertures 114 (e.g., 114A, 114B) for connection to a portion of arm assembly 108. In addition, user assembly 104 may include other components, such as a rear pouch 107 and/or a holster for a water bottle 109.

Figure 3:
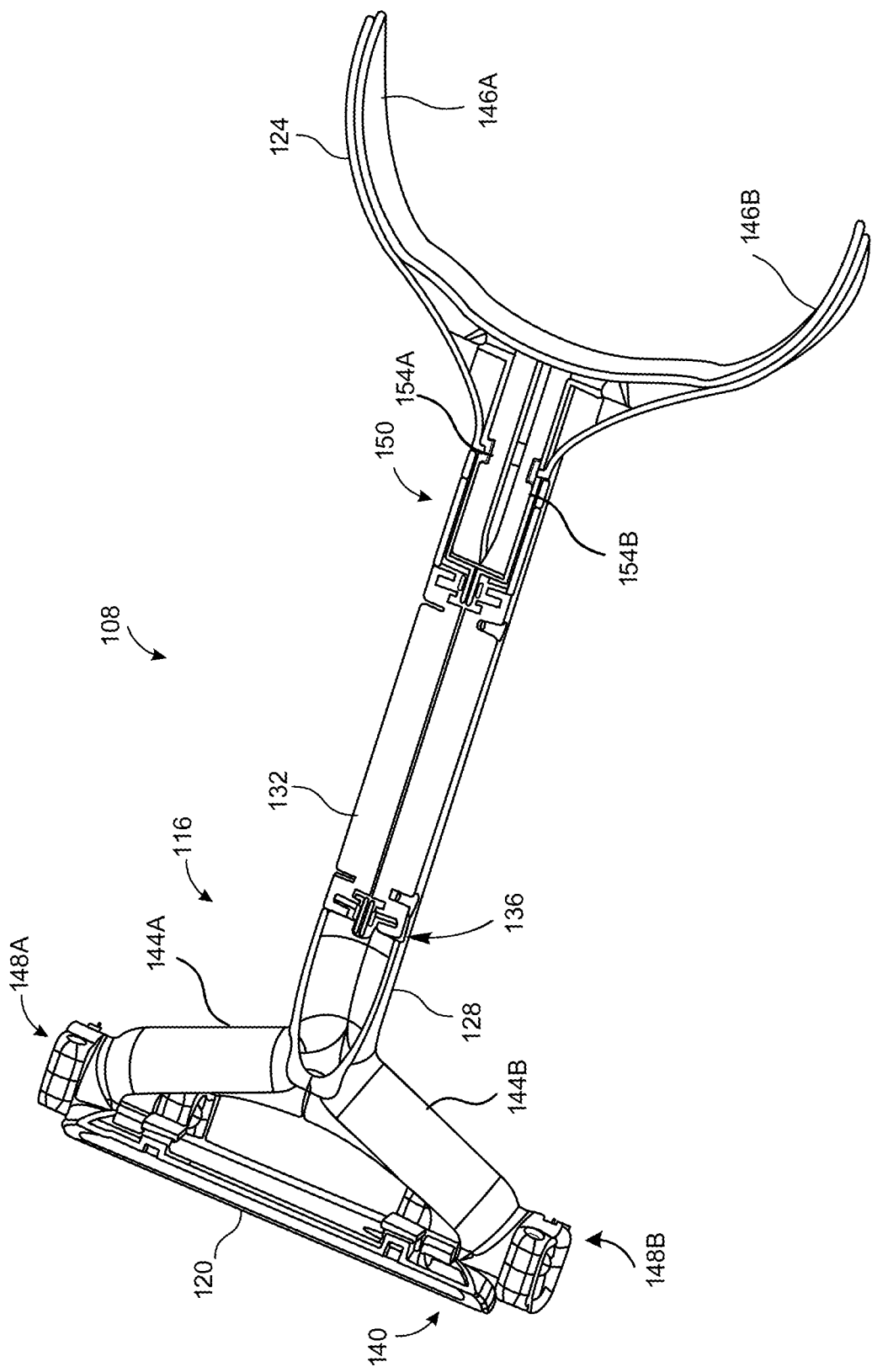
FIG. 3 is a partial cut-away view of a portion of an attachment for a stroller in accordance with an embodiment of the present invention.
Figure 4:
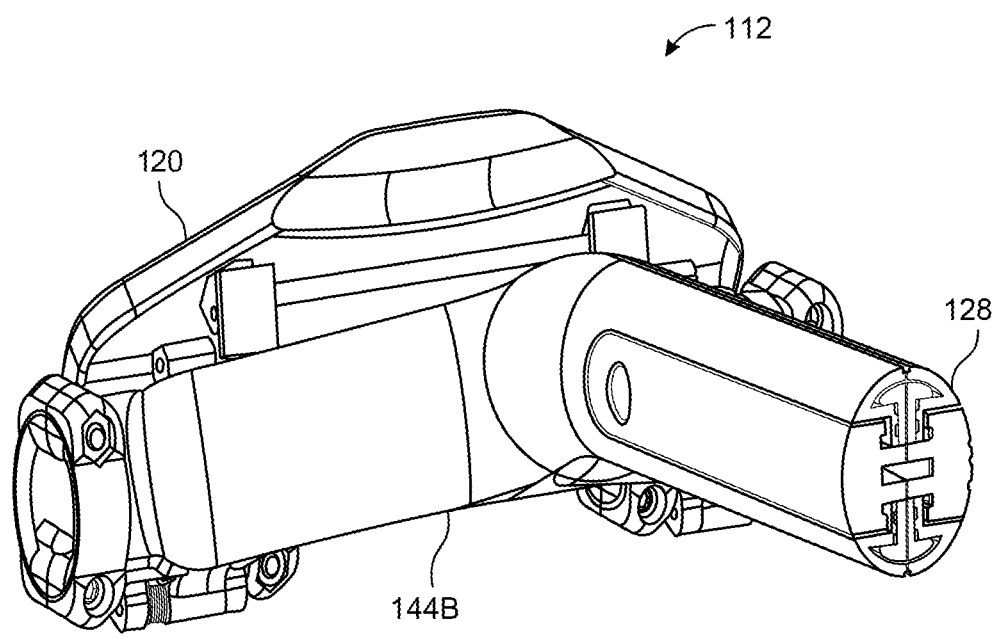
FIG. 4 is a perspective view of another portion, of the attachment for a stroller in accordance with an embodiment of the present invention.
Figure 5:
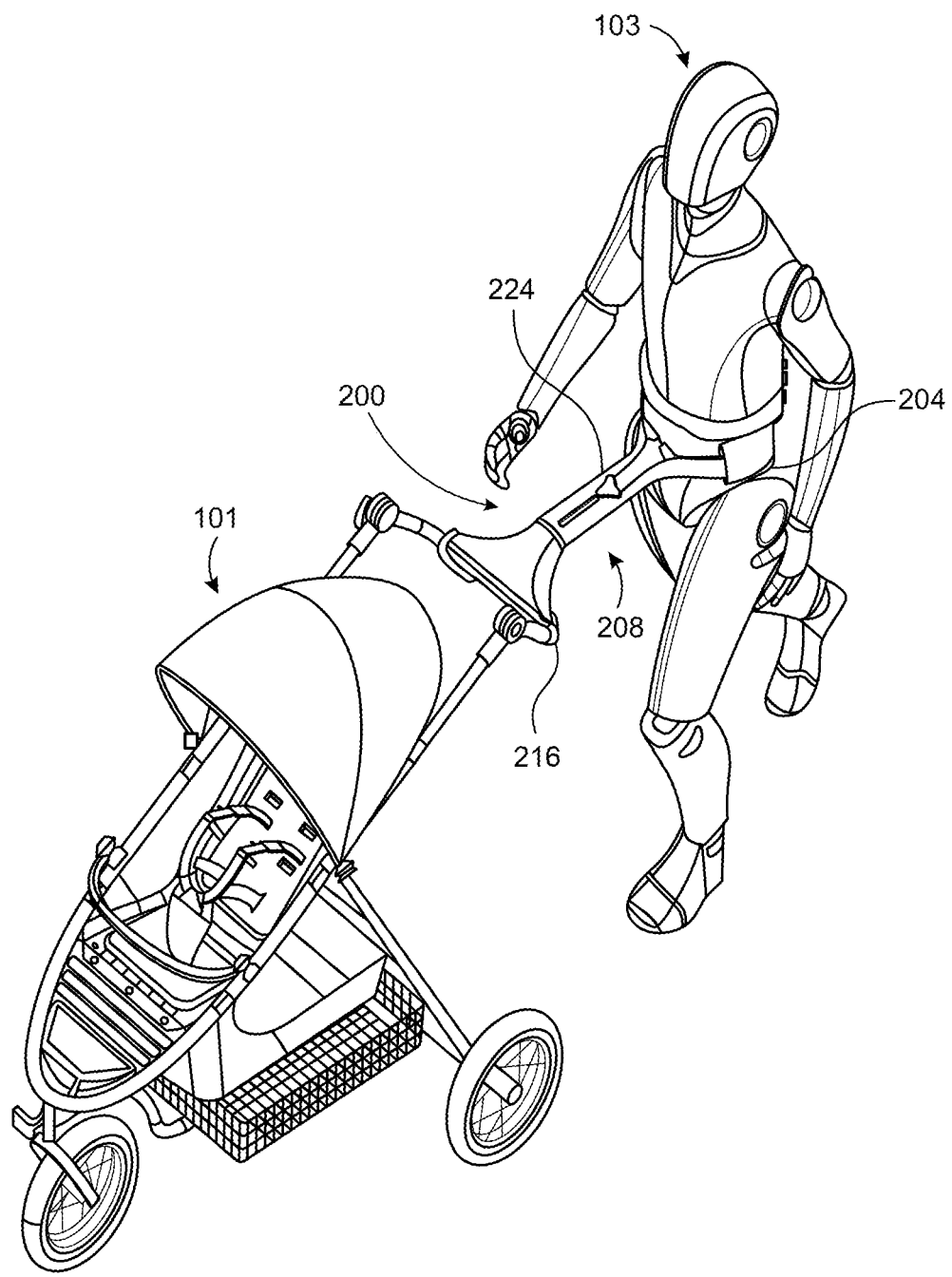
FIG. 5 is a perspective view of an attachment for a stroller shown in use in accordance with another embodiment of the present invention.

With reference now to FIG. 3, arm assembly 108 is disposed between pusher 103 and stroller 101. Although arm assembly 108 is typically rigid in construction so as to facilitate hands-free steering of stroller 101, the arm assembly is configured to allow for some longitudinal movement so as to accommodate the natural hip movements of the pusher. In an embodiment, and at a high level, arm assembly 108 includes a push arm assembly 116, stroller connector 120, and a user assembly connector 124. In an embodiment, push arm assembly 116 is a telescopic, partially nesting, two-part assembly (including a forward arm 128 and a rear arm 132) that allows for pusher 103 to adjust the distance from stroller 101.

Push arm assembly 116 can be designed and configured to slightly "shimmy" forward and back to reduce steering sensitivity and hip motion from the pusher 103 via the use of a dampener 136. In an embodiment, dampener 136 is also used to couple forward arm 128 with rear arm 132. Front aim 128 includes a first portion 144A and second portion 144B that couple to the handlebar of stroller 101 at their respective distal ends, 148A and 148B. So as to allow push arm assembly 116 to have positive connections with stroller 101 while still allowing for some motion, e.g., pivoting, first portion 144A and 144B may be attached to the handle of stroller 101 via clamp mechanisms 140 that allow push arm assembly 116 to rigidly interface with the stroller, while pivoting with respect to the handlebar. Pivoting push aim assembly 116 during use helps prevent the front wheel(s) of stroller 101 from bobbing up and down off the ground and thus provides a more comfortable experience for pusher 103 and the occupant of stroller 101.

Rear arm 132 is coupled to front arm 128 and includes left and right hip-wraps 146 and a central telescopic tube 150. Central telescopic tube 150 allows for additional adjustment of arm assembly 108 to conform to the stride and body geometry of the user as well as the geometry of the stroller 101. In an embodiment, central telescopic tube 150 is formed by two 'half-tubes' made up from two identical arms (e.g., 154A, 154B). Central telescopic tube 150 is fastened independently on each of the left and the right sides. These arms 154A and 154B nest together are designed to "shimmy" forward and back more than the front arm 128 to absorb unwanted hip motion from pusher 103. Each of arms 154A and 154B terminates in a respective hip-wrap 146, for example hip-wrap 146A and hip-wrap 146B.

In operation, the user attaches the handle bar attachment mechanisms 140 to the handlebars of stroller 101 at the desired spacing. In an embodiment, four of these attachment mechanisms may nest into position to make a more rigid connection onto, typically, foam clad bent metal bars of the handle of stroller 101. In an embodiment, internal ribbed features of attachment mechanism 140 cut into the foam so that they are rigidly set into place to provide a crisp interface without the softness typically associated with the foam handlebars. Additionally, the attachment mechanism 140 may include two clasps (not shown) that are counter sprung with torsion springs (not shown) such that the clasps tend to always want to close around the handlebar, to aid in ease of use. These clasps are integral with attachment mechanisms 140 (typically residing on the periphery of the attachment mechanism) and using the single clasp that may employ an over-center linkage to snap into place so that running attachment 100 is attached to the stroller. The release of the single clasp can quickly remove the running attachment 100 from stroller 101. Optionally, a safety tether (not shown) is attached to stroller 101 and to running attachment 100.

User 103 then fastens the user assembly 104 to their torso, preferably just above the waist line. The slightly cantilevered positioning between this pivot point and arm assembly 108 creates a slightly flexible connection that assists with dampening.

FIGS. 5 to 10 show another embodiment of an attachment, attachment 200, for hands-free pushing of a pushable device by a user. As with attachment 100, attachment 200 allows a user 103 to push the pushable device, such as stroller 101, without using hands or forearms on a handlebar or similar connection point of the device. Attachment 200 includes a user assembly 204 that removably attaches around the waist of pusher 103, an arm assembly 208 that connects user assembly 204 to stroller 101, and includes a push arm assembly 216 and a user assembly connector 224.

Figure 6:
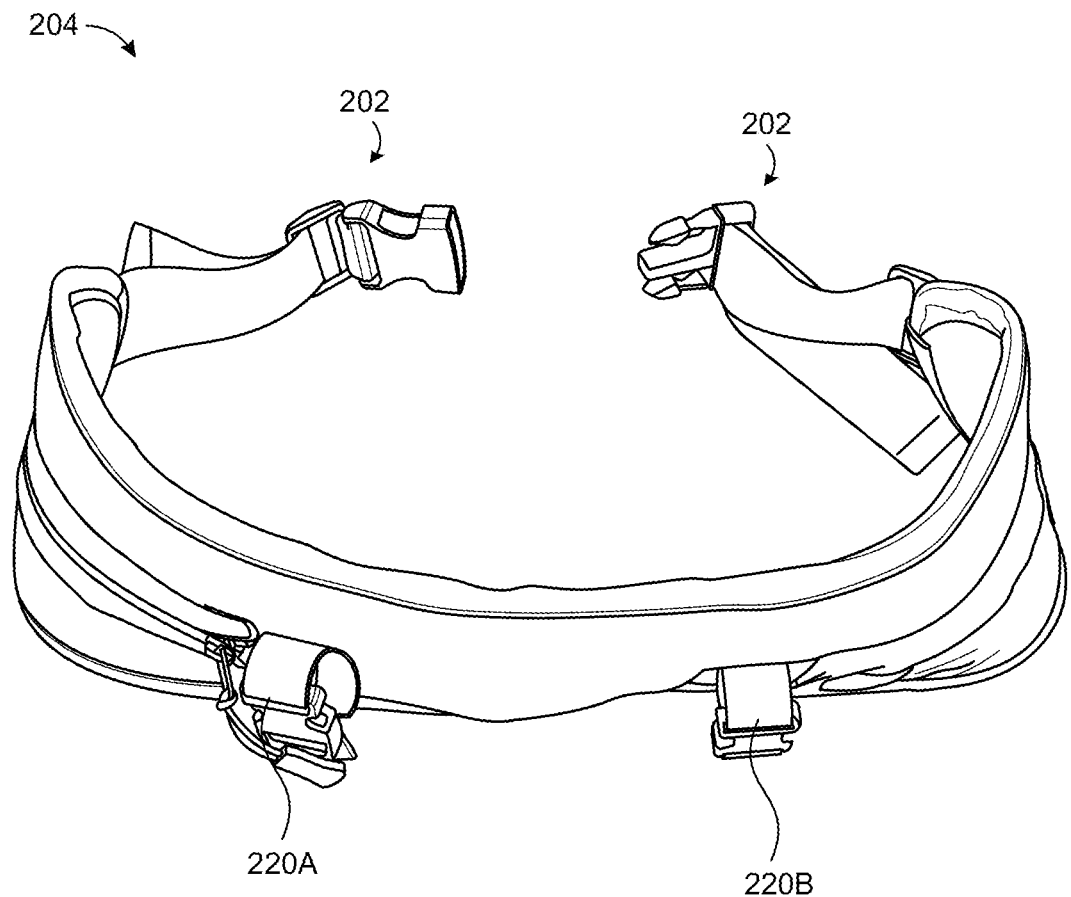
FIG. 6 is a perspective view of a user assembly for an attachment for a stroller in accordance with another embodiment of the invention.
Figure 7:
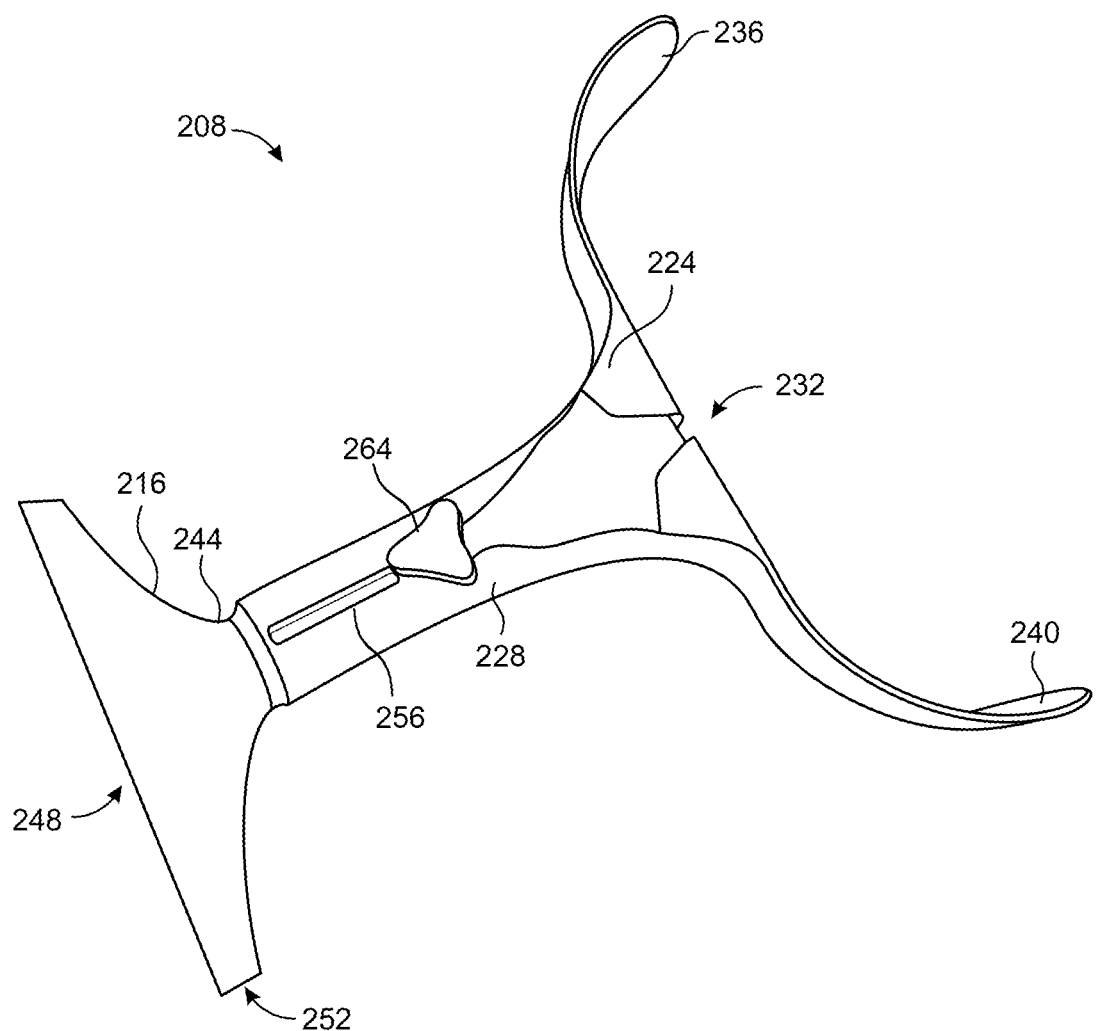
FIG. 7 is a perspective view of a portion of the attachment of FIG. 5.

User assembly 204, shown apart from running attachment 200 in FIG. 6, connects arm assembly 208 to user 103. User assembly 204 may be made of any suitable material, such as, but not limited to, nylon or PVC fabric, and may be secured around the pusher's waist by any suitable mechanism, including ties, hook-and-loop straps, and side release buckles 202. User assembly 204 may also include attachment portions 220 (e.g., 220A, 220B) for receiving and securing portions of push arm assembly 216. User assembly connector receptors 218 may be pockets or pouches, and may be tightened or secured by any suitable mechanism or combination, such as zippers, friction, buckles, and hook-and-loop straps. Safety straps are preferably included so that push arm assembly 216 remains secured to user assembly 204 even if push arm assembly 216 accidentally detaches from user assembly connector receptors 220.

User assembly connector 224 and push arm assembly 216 are designed to be detachably connected to each other to form arm assembly 208, which is preferably a substantially rigid attachment segment and is shown unattached to a stroller or user assembly 204 in FIGS. 7-10. User assembly connector 224 is designed to be attached to user assembly 204 and engage with a user's waist/torso so that the user can push an attached stroller. User assembly connector 224 includes a rod or tube 228 that is connected to a push arm assembly 216. Tube 228 projects away from user assembly connector 224 and is configured to connect to a counterpart member of push arm assembly 216 (discussed below). User assembly connector 224 is preferably rigid. (As used herein, rigid means that a component or connected components do not significantly distort under forces typically involved by a user pushing a stroller at a walking or running pace on typical surfaces such as asphalt, concrete, gravel, dirt roads, etc.) User assembly connector 224 includes a first portion 232 designed to engage with the front of a user's waist, preferably at about the belt level. On opposite ends of first portion 232 are a right curved portion 236 and a left curved portion 240, which are designed to engage with the user's right side and left side, respectively, preferably at about the same level (height) as first portion 232. In this way, the overall forward motion of the user/pusher is smoothly transferred through stroller attachment system to an attached stroller.

Figure 9:
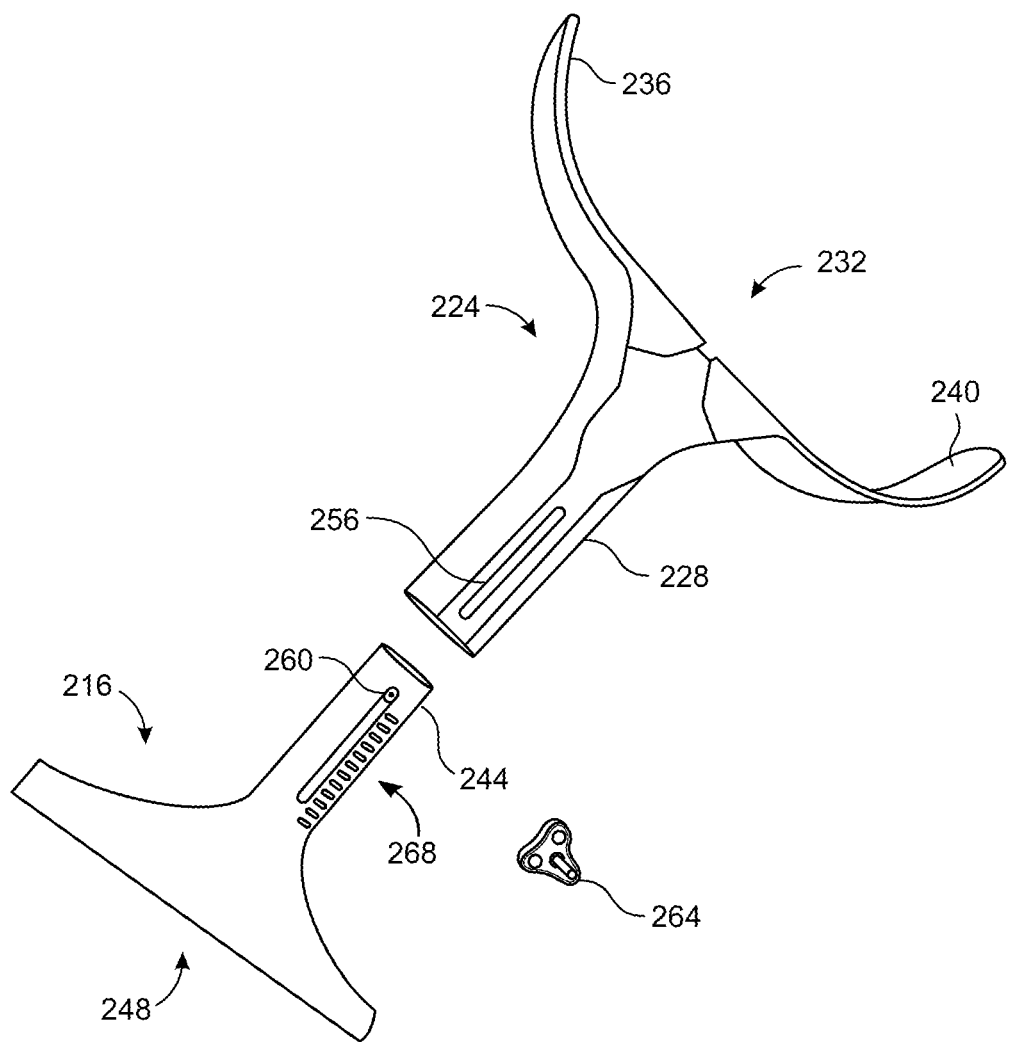
FIG. 9 is a perspective view of the portion of the attachment shown in FIG. 7 with some components separated.
Figure 10:
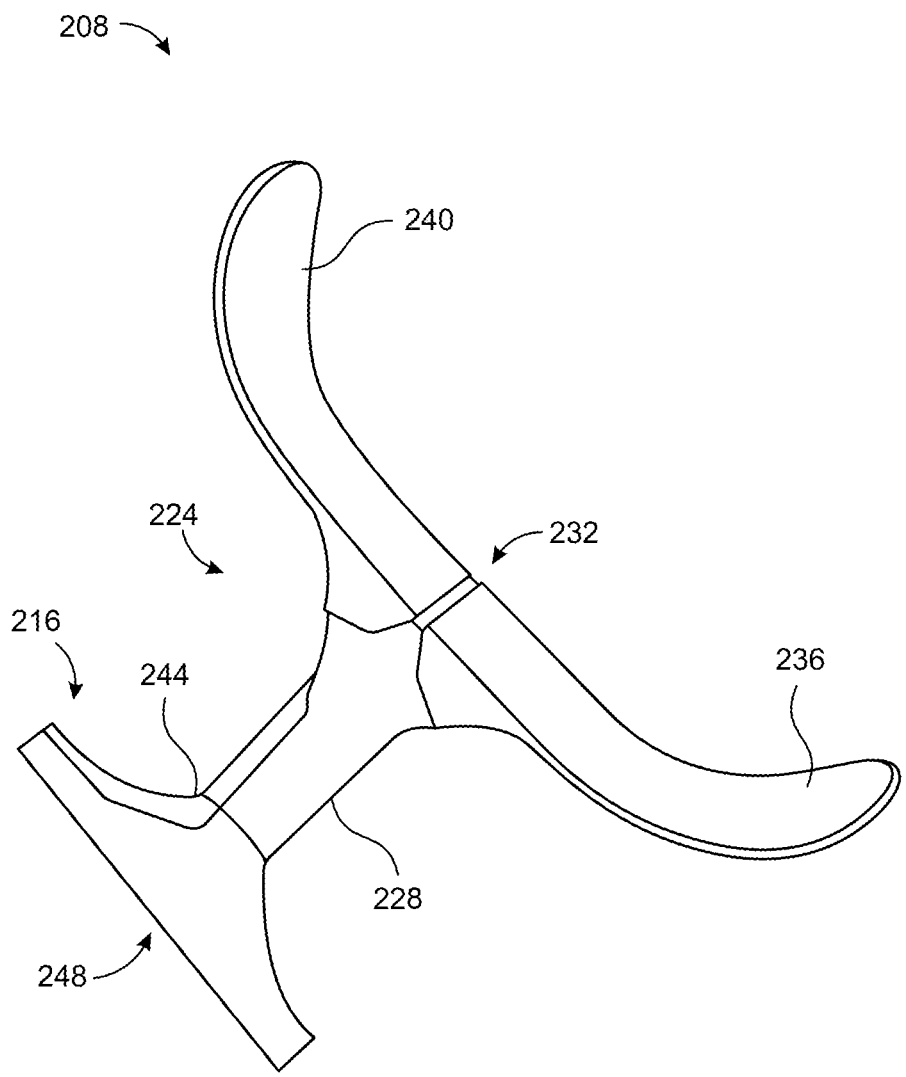
FIG. 10 is a perspective view from the bottom showing the portion of the attachment shown in FIG. 7.
Figure 11:
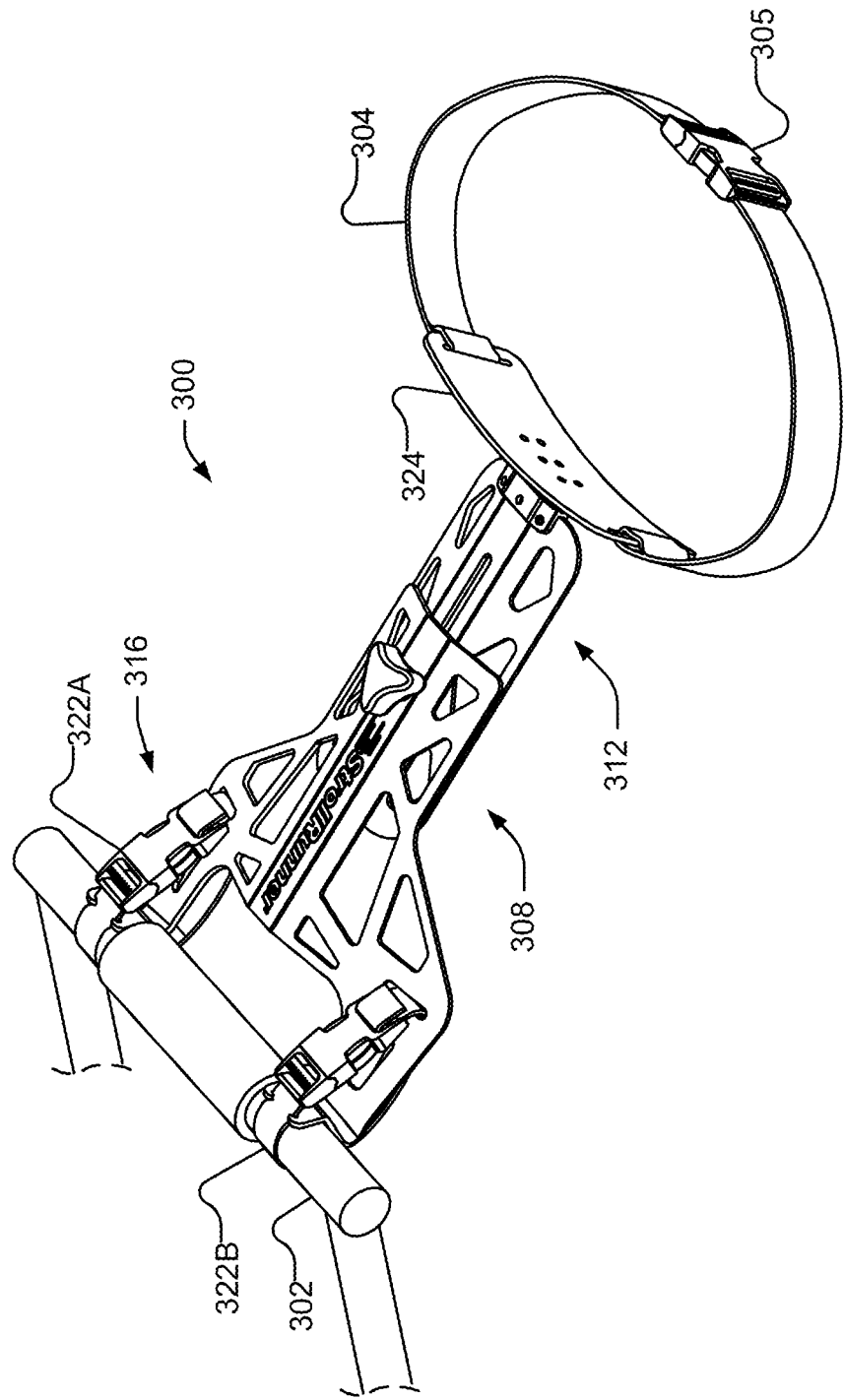
FIG. 11 is a perspective view of an attachment for a stroller in accordance with another embodiment of the present invention shown attached to a stroller handle on one end and connected to a waist band on the other.

Push arm assembly 216 includes a rod or tube 244 and a stroller handle engagement member, stroller handle connector 248. Tube 244 is designed and configured to connect to tube 228 to form a substantially rigid connection between push arm assembly 216 and user assembly connector 224. For example, tube 244 may be designed to slide into tube 228 and be secured in place by any suitable mechanism. Tube 228 may include, for example, a slot 256 that is aligned with a receiver 260 (such as a threaded receiver as can be seen in FIG. 9) in tube 244. When tube 244 is inserted over (or into, in the alternative) tube 228 to the desired extent, a screw knob 264 or other securement mechanism can be used to maintain the connection at the desired point. In this way, the distance between the pusher and the stroller may be adjusted. In addition, optional distance markings 268 (as can be seen in FIG. 9) may be included so that different users can set a preferred distance. It will be understood that in the alternative tube 244 and tube 228 may be replaced by a single piece such that arm assembly 208 is formed of a uniform body.

Figure 8:
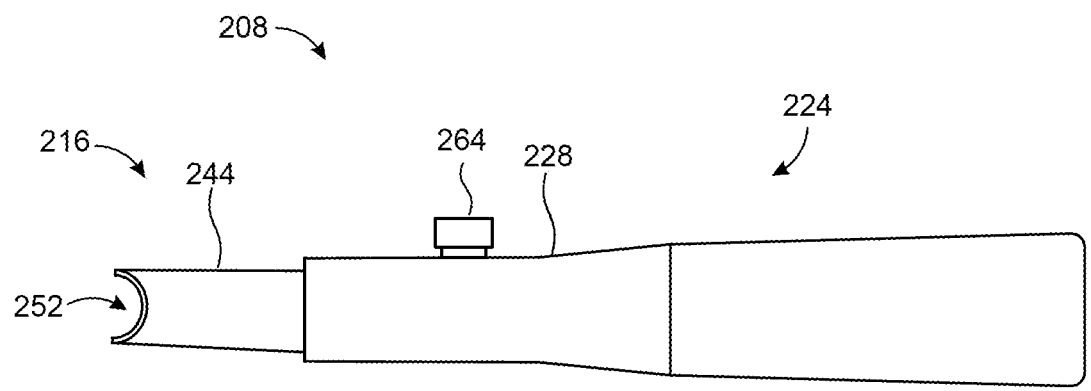
FIG. 8 is a side view of the portion of the attachment shown in FIG. 7.

Stroller handle connector 248 is designed and configured to be removably attached to the handle of a stroller. In a preferred embodiment, as best seen in FIG. 8, the attachment mechanism is a C-shape or half circle 252 that can snap over a stroller handle, which allows for convenient attachment and detachment as well as providing a safety break-away mechanism.

Figure 12:
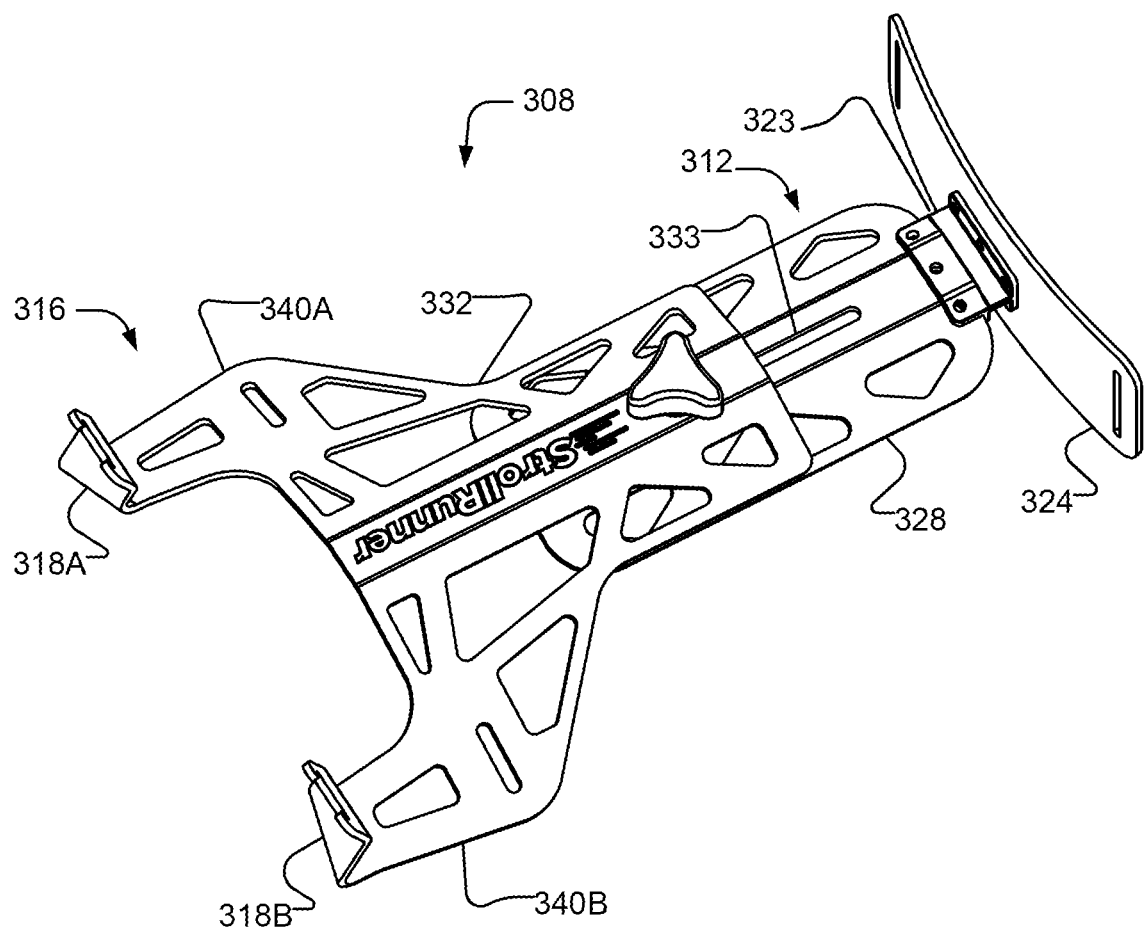
FIG. 12 is a perspective view of the attachment for a stroller shown in FIG. 11.

Turning to FIGS. 11-15, another embodiment is shown of an attachment, attachment 300, for hands-free pushing of a pushable device by a user. As with attachments 100 and 200, attachment 300 allows a user to push and exert some control over the pushable device, such as a stroller, without using hands or forearms on a handlebar 302 or similar connection point of the device. An arm assembly 308 connects the user to the pushable device, and includes a push arm connector assembly 316 and a user connector assembly 312. Push arm connector 316 attaches to handlebar 302 via a pair of handle engagement members 318 (e.g., 318A, 318B as can be seen in FIG. 12) that may be further secured to handlebar 302 with straps 322 (e.g., 322A, 322B, shown in FIG. 11). User connector assembly when in use is attached to push arm connector assembly 316 as well as the user via a user engagement member 324 that can be attached to a user attachment assembly 304 (shown in FIG. 11), such as a waistband or belt-like strap, that removably attaches around the waist of the pusher. User assembly 304 may be made of any suitable material, such as, but not limited to, nylon or PVC fabric, and may be secured around the pusher's waist by any suitable mechanism, including ties, hook-and-loop straps, and a side release buckle 305.

User assembly 304 in combination with user engagement member 324 are designed to engage with a user's waist/torso so that the user can push and control the pushable device through arm assembly 308. To that end, user engagement member 324 may be slightly curved inward with respect to the user and extend substantially horizontally in order to engage with a portion of the user's waist area. In this way, when attached to the user with user assembly 304, user engagement member 324 allows for a degree of hands-free control while also allowing the user to walk or run without significant interference. In addition, in a preferred embodiment, user engagement member 324 is made of a slightly flexible material, such as a slightly flexible plastic or metal, that allows for slight side to side flexing when subject to forces from the user's forward motion.

User connector assembly 312 includes a user-side member 328 and push arm connector assembly 316 includes a device-side member 332. User-side member 328 is connected to user engagement member 324 on one end and engages with device-side member 332 on the other end. User engagement member 324 may be connected to user-side member 328 via an attachment plate 323 (shown in FIGS. 12 and 13) or similar such that in a preferred embodiment attachment plate 323 allows for a slight vertical motion in order to dampen some of the motion of the user.

Device-side member 332 includes on the device side a pair of arms 340 (e.g., 340A, 340B) on one end that support handle engagement members 318 and engages with user-side member 328 on the other end.

User-side member 328 and device-side member 332 are designed to slidably engage such that a length of arm assembly 308 is adjustable. In a preferred embodiment, device-side member 332 includes an aperture 333 and user-side member 328 includes a slot 329, wherein when user-side member 328 and device-side member 332 are engaged aperture 333 is aligned with a portion of slot 329. A securement mechanism 336 (e.g., 336A (knob) and 336B (handle bolt) in FIG. 14) is used to lock user-side member 328 and device-side member 332 in a selected position to maintain a desired length of arm assembly 308. In this way, the overall length of arm assembly 308 is easily adjustable. In a preferred embodiment, user-side member 328 slides under device-side member 332 and a top of user-side member 328 is designed to receive and engage with a bottom of device-side member 332. In a preferred embodiment, the bottom side is concave and the top side is convex. When secured with securement mechanism 336, arm assembly may preferably be substantially rigid with respect to the length of arm assembly 308 in the direction between the user and the pushable device. As used herein, rigid means that a component or connected components do not significantly distort under forces typically involved by a user pushing a stroller at a walking or running pace on typical surfaces such as asphalt, concrete, gravel, dirt roads, etc. At the same time, securement mechanism 336 in combination with slot 329 and aperture 333 are configured to allow a slight amount of side to side motion to dampen the fluctuations inherent in the force translated from the user's walking or running motion.

Figure 13:
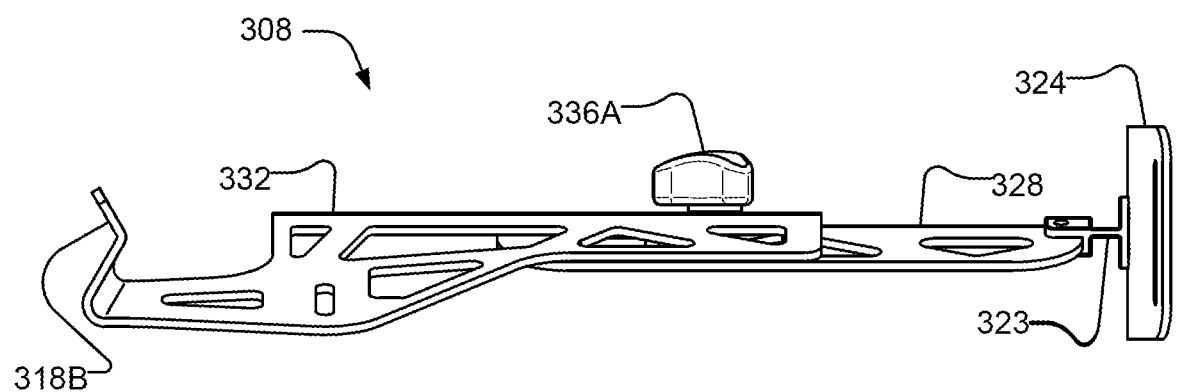
FIG. 13 is a side view of the attachment shown in FIG. 12.
Figure 14:
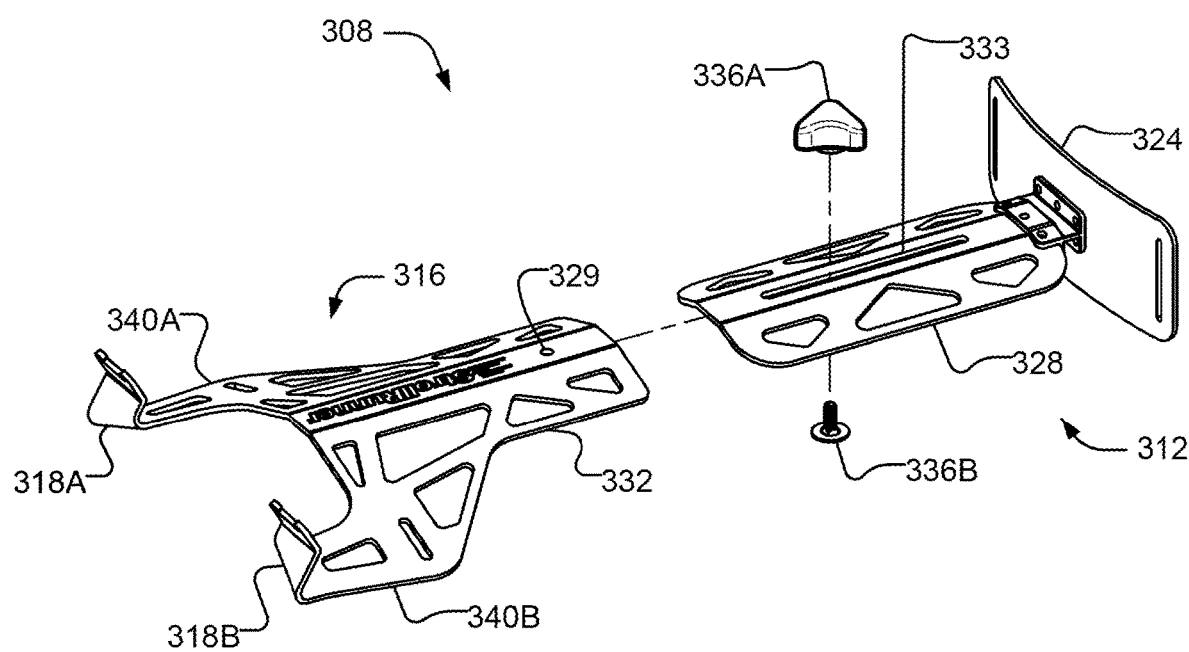
FIG. 14 is a partially exploded perspective view of the attachment shown in FIG. 12.
Figure 15:
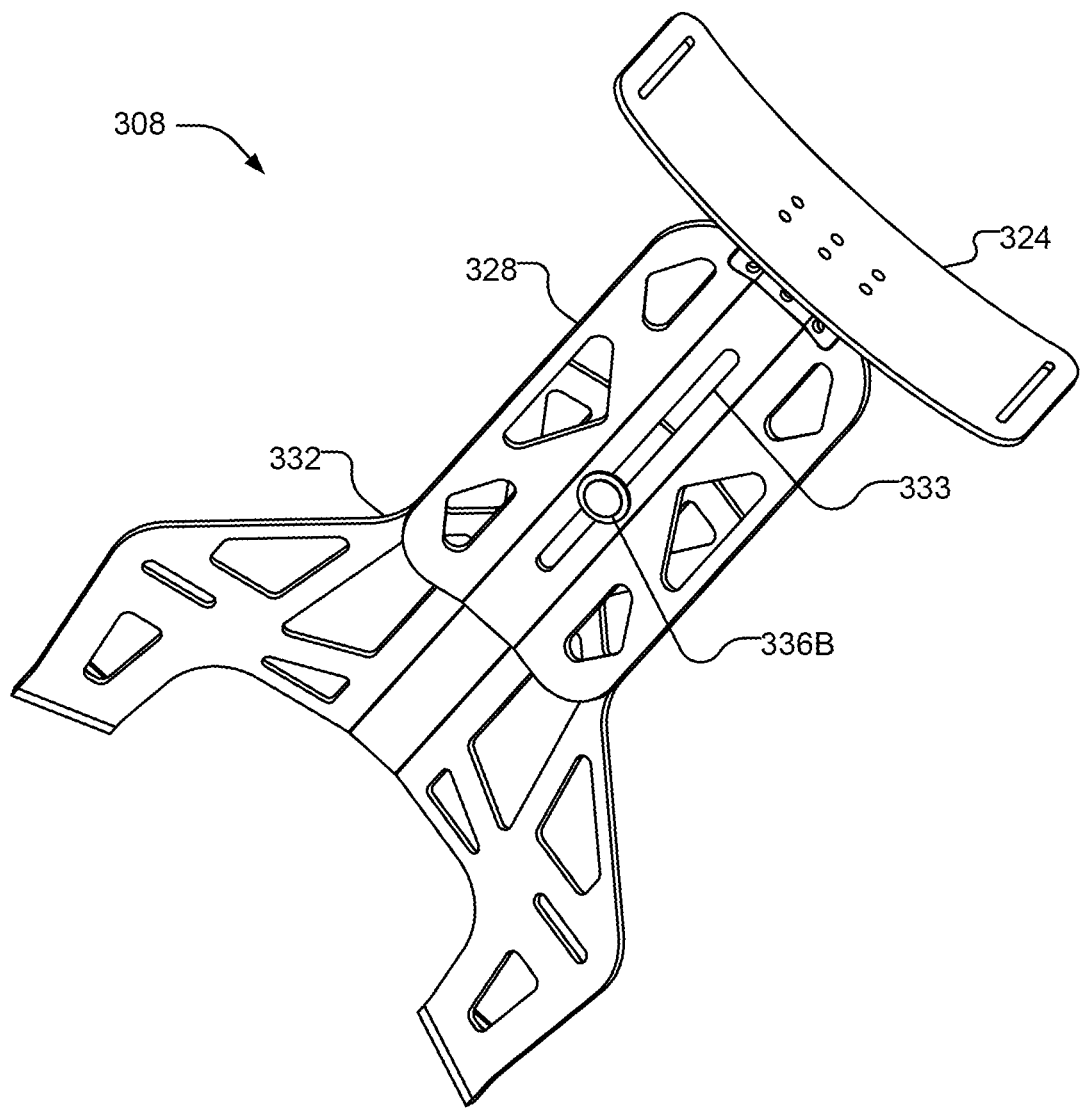
FIG. 15 is a perspective view from of the bottom of the attachment shown in FIG. 12.

As can be seen in FIG. 13, arm assembly 308 has a generally narrow profile in the vertical direction when in use.

Figure 16:
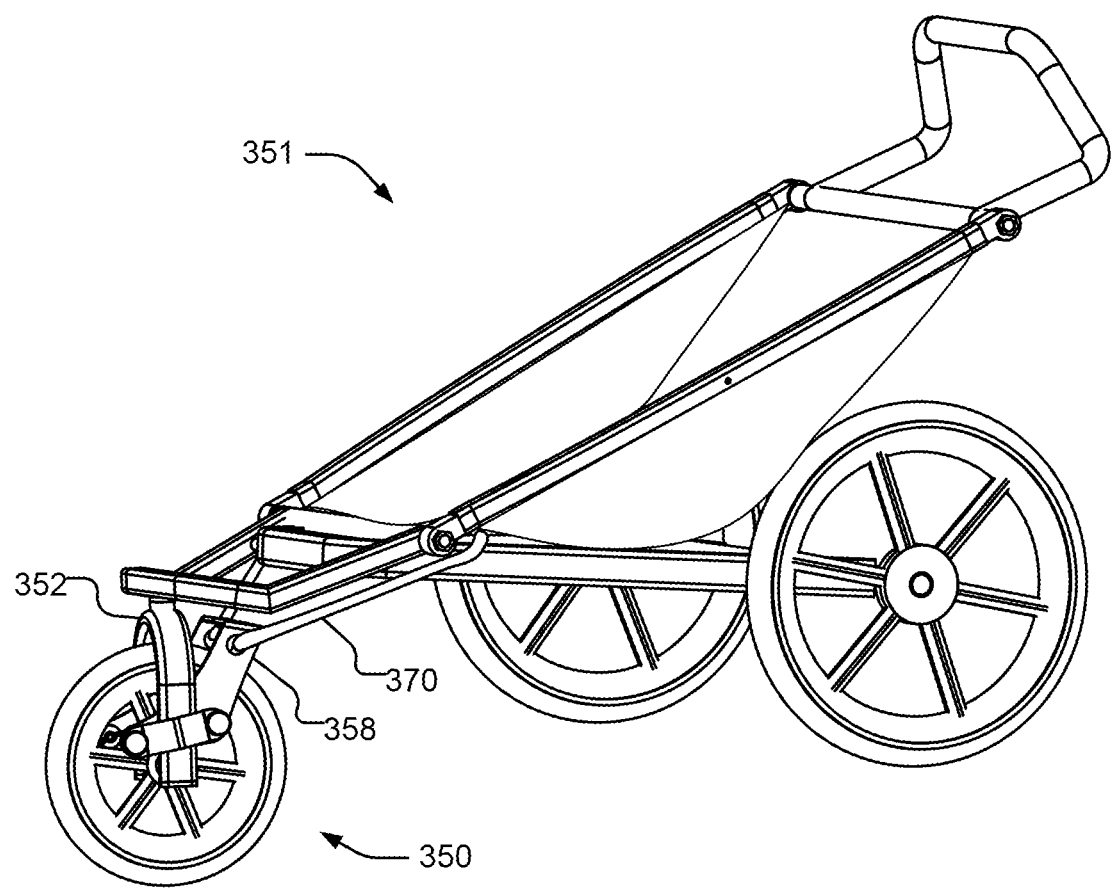
FIG. 16 shows a pushable device with a wheel stabilizer/dampener system attached in accordance with an embodiment of the present invention.
Figure 17:
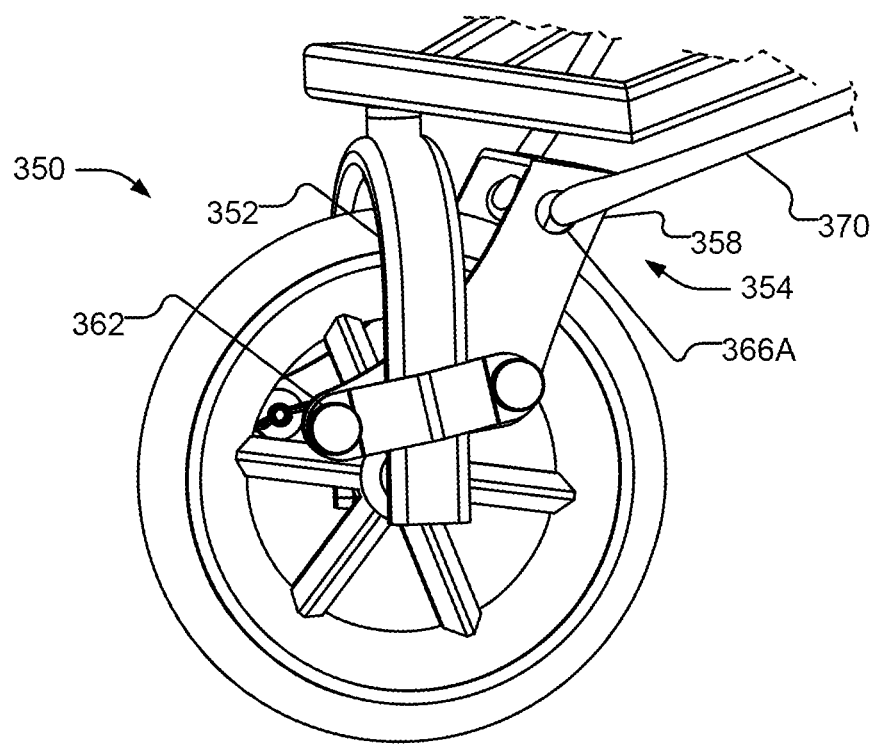
FIG. 17 is a detailed view of a portion of the wheel stabilizer/dampener system of FIG. 16.

In addition or in the alternative, a wheel stabilizer system, such as the wheel stabilizer system shown in FIGS. 16-17, may be attached to a wheel of the pushable device to assist with dampening drift or wobble that may occur when an attachment of the present invention is used to push the device. (For example, the front wheel of a jogging stroller may have weight removed and lift off the ground slightly during use, which could allow the wheel to turn in an unwanted direction.) In FIG. 16, a portion of a stroller 351 is shown that has a front wheel 350, which is connected to stroller 351 via a fork 352. A wheel stabilizer system 354 is attached to fork 352 with a suitable mechanism 362, such as wing nuts and thumb screws, that connect a U-shaped member 358 or similar to fork 352 on both sides of wheel 350. Member 358 is releasably attached to a stable portion of stroller 351 via a resistance connector 370, such as a spring or bungee cord. To facilitate the connection, member 358 may include a ridge, ledge, holes 366 (e.g., 366A), or similar for receiving connector 370. In this way, when connected wheel stabilizer system 354 provides a user-selected amount of resistance (depending on the tension placed on connector 370) to the pivoting motion of wheel 350.

In an embodiment, an attachment for hands-free pushing of a pushable device includes a push arm assembly having a connector portion and a first tube, wherein the connector portion has a first side and an opposing side, wherein the first tube is coupled to the connector portion on the opposing side and projects away from the first side of the connector portion. A handle engagement member is coupled to the first side, a user assembly connector has a second tube and a user engagement portion, wherein the second tube slidably connects with the first tube. The user engagement portion has a first portion, a right curved part coupled to the first portion, and a left curved part coupled to the first portion, wherein the first portion engages with a front part of a waist of a pusher, the right curved part engages with at least a part of the pusher's right side, and the left curved part designed to engage with at least a part of the pusher's left side. The second tube projects away from the user engagement portion. A user assembly has a left support and a right support, wherein the right support releasably attaches the right curved part to the user assembly and the left support releasably attaches the left curved part to the user assembly, wherein the first tube and the second tube provide the only connection between the push arm assembly and the user assembly connector.

Additionally or alternatively, a distance between the device connection portion and the user engagement portion when the user assembly connector is connected to the push arm assembly is adjustable.

Additionally or alternatively, the second tube includes a slot and the first tube includes a receiver for a securement mechanism designed and configured to secure the second tube at a selected insertion point by passing through the slot and engaging the receiver.

Additionally or alternatively, the securement mechanism is a screw knob.

Additionally or alternatively, the attachment includes a plurality of markings associated with the distance.

Additionally or alternatively, the user assembly further includes at least one strap positioned and designed to be secured around the user engagement portion when the user assembly connector is supported in the user assembly.

Additionally or alternatively, the device connector portion is C-shaped.

In another embodiment, an apparatus for hands-free pushing of a pushable device includes a handle attachment for attaching to the pushable device that has a push arm assembly and a user assembly connector. The user assembly connector has a first portion designed to engage with a front part of a waist of a pusher, a first curved part designed to engage with at least a part of one side of the pusher, and a second curved part designed to engage with at least a part of an opposite side of the pusher. A connector connects the push arm assembly to the user assembly connector and a user assembly is designed and configured to releasably receive and attach to the user assembly connector, wherein the push arm assembly, the connector, and the user assembly connector form a rigid connection between the pushable device and the pusher when connected.

Additionally or alternatively, the connector is adjustable in length.

Additionally or alternatively, the connector includes a slot and a receiver for a securement mechanism designed and configured to secure the connector at a selected length by passing through the slot and engaging the receiver.

Additionally or alternatively, the securement mechanism is a screw knob.

Additionally or alternatively, the apparatus includes a plurality of length markings on the connector.

Additionally or alternatively, the user assembly further includes at least one strap positioned and designed to be secured around the user assembly connector.

Additionally or alternatively, the push arm assembly includes a C-shaped portion configured to engage with a stroller handle In another embodiment, an attachment for hands-free pushing of a pushable device includes a push arm assembly having a handle engagement member and a first tube and a user assembly connector having a second tube and a user engagement portion, wherein the second tube is designed to connect to the first tube, wherein the user engagement portion includes a user assembly connector on a pusher side, the user assembly connector including a first portion designed to engage with a front part of a waist of a pusher, a right curved part designed to engage with at least a part of the pusher's right side, and a left curved part designed to engage with at least a part of the pusher's left side, and wherein the second tube is connected to the user engagement portion opposite the pusher side and projects away from the user engagement portion.

Additionally or alternatively, a distance between the handle engagement member and the user engagement portion when the user assembly connector is connected to the push arm assembly is adjustable.

Additionally or alternatively, the second tube includes a slot and the first tube includes a receiver for a securement mechanism designed and configured to secure the second tube at a selected insertion point by passing through the slot and engaging the receiver.

Additionally or alternatively, the securement mechanism is a screw knob.

Additionally or alternatively, the first tube includes a plurality of markings associated with the distance.

Additionally or alternatively, the pushable device connection portion is C-shaped.

In another embodiment, an attachment for a pushable device includes a push arm assembly and a pusher engagement member having a first portion, a first curved part, and a second curved part, wherein the first portion is designed to engage with a front part of a waist of a pusher, wherein the first curved part is designed to engage with at least a part of one side of the pusher, and wherein the second curved part designed to engage with at least a part of an opposite side of the pusher. A connector connects the push arm assembly to the pusher engagement member, wherein the push arm assembly, the connector, and the pusher engagement member form a rigid connection between the pushable device and the pusher when connected.

Additionally or alternatively, the connector is adjustable in length.

Additionally or alternatively, the connector includes a slot and a receiver for a securement mechanism designed and configured to secure the connector at a selected length by passing through the slot and engaging the receiver.

Additionally or alternatively, the securement mechanism is a screw knob.

Additionally or alternatively, a plurality of length markings are on the connector.

Additionally or alternatively, the push arm assembly includes a C-shaped portion configured to engage with a handle of the pushable device.

Additionally or alternatively, the first portion, the first curved part, and the second curved part are a unitary assembly.

Additionally or alternatively, the rigid assembly is the only connection between the pushable device and the pusher.

In another embodiment, an attachment device is provided for use by a pusher of a pushable device, the pusher having a user connector around the waist of the pusher, the pusher including a plurality of attachment portions. The attachment device includes a push arm assembly having a proximate end and a distal end, a user assembly connector coupled to the push arm assembly at the proximate end and coupled to the user connector at the plurality of attachment portions, and a handle connector coupled to the push arm assembly at the distal end.

Additionally or alternatively, the push arm assembly includes a first tube, wherein the handle connector includes a second tube, and wherein the first tube and the second tube slidably engage with each other.

Additionally or alternatively, the handle connector is adjustable in length.

Additionally or alternatively, the handle connector includes a slot and a receiver for a securement mechanism designed and configured to secure the handle connector at a selected length by passing through the slot and engaging the receiver.

Additionally or alternatively, the securement mechanism is a screw knob.

Additionally or alternatively, a plurality of length markings are on the handle connector.

Additionally or alternatively, the push arm assembly includes a C-shaped portion on the distal end configured to engage with a handle of the pushable device.

In another embodiment, a wearable user assembly is provided for connecting an attachment device, used to push a pushable device, to a pusher, the attachment device including a pusher engagement member having a first portion, a first curved part, and a second curved part, wherein the first portion is designed to engage with a front part of a waist of the pusher, wherein the first curved part is designed to engage with at least a part of one side of the pusher, and wherein the second curved part designed to engage with at least a part of an opposite side of the pusher. The wearable user assembly includes a front portion including a first and second attachment portions, the first and second attachment portions sized and configured to accept a respective one of the first curved part and the second curved part, and wherein the first and second attachment portions secure the first curved part and the second curved part proximate the waist of the user, and a rear portion, the rear portion being adjustable so as to secure the wearable user assembly connector to the pusher.

Additionally or alternatively, a first strap is positioned and designed to be secured around the first curved part when the first curved part is secured by the first attachment portion and a second strap positioned and designed to be secured around the second curved part when the second curved part is secured by the second attachment portion.

In another embodiment, a method of pushing a pushable device includes securing an attachment device to the pushable device, the attachment device including a first tube and a second tube, the first tube nestable within the second tube so as to create single rod between a pusher and the pushable device, connecting the attachment device to the pusher, and adjusting the distance between the pusher and the pushable device by moving the first tube relative to the second tube so as to lengthen or shorten the single rod.

Additionally or alternatively, the attachment device includes a pusher engagement member having a first portion, a first curved part, and a second curved part, wherein the first portion is designed to engage with a front part of a waist of the pusher, wherein the first curved part is designed to engage with at least a part of one side of the pusher, and wherein the second curved part designed to engage with at least a part of an opposite side of the pusher.

Additionally or alternatively, a user connector assembly is provided that includes a front portion and a rear portion, the front portion including a first and second attachment portions, the first and second attachment portions sized and configured to accept a respective one of the first curved part and the second curved part, wherein the first and second attachment portions secure the first curved part and the second curved part proximate the waist of the user, and wherein the rear portion is adjustable so as to secure the wearable user assembly connector to the pusher Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An attachment for hands-free pushing of a pushable device, the attachment comprising:
　an arm assembly having a device side and a user side and including:
　　a push arm connector assembly on the device side, the push arm assembly including a plurality of handle engagement members configured to engage with a handle of the pushable device and a device-side engagement member; and
　　a user connector assembly on the user side including a user-side engagement member and a user engagement member, wherein the user engagement member is a curved surface that curves inward with respect to a user, and extends horizontally sufficiently to engage with a substantial portion of a front of the user when attached to the user,
wherein the device-side engagement member and the user-side engagement member are configured to be secured together with a selected amount of overlap between the device-side engagement member and the user-side engagement member, wherein the user-side engagement member includes a slot and the device-side engagement member includes an aperture, and wherein the aperture is aligned with the slot when the device-side engagement member and the user-side engagement member are overlapping.

2. The attachment according to claim 1, further including a securement mechanism, wherein the securement mechanism rigidly secures the selected amount of overlap between the device-side engagement member and the user-side engagement member between the pushable device by engaging the aperture and the slot while allowing slight side to side motion between the device-side engagement member and the user-side engagement member.

3. The attachment according to claim 1, wherein an upper surface of the device-side engagement member is configured to engage with a lower surface of the user-side engagement member.

4. The attachment according to claim 3, wherein the upper surface of the user-side engagement member is convex and the lower surface of the device-side engagement member is concave.

5. The attachment according to claim 1, further including a waistband connected to a left side of the user connector and to a right side of the user engagement member.

6. The attachment according to claim 1, wherein the user-side engagement member is operably attached to the user engagement member in only one location and wherein the user-side engagement member and the user engagement member are attached with an attachment plate and wherein the attachment plate provides for vertical motion between the user-side engagement member and the user engagement member.

7. An attachment for hands-free pushing of a pushable device, the attachment comprising:
   an arm assembly having a device side and a user side and including:
      a push arm connector assembly on the device side, the push arm assembly including a plurality of handle engagement members configured to engage with a handle of the pushable device and a device-side engagement member; and
      a user connector assembly on the user side including a user-side engagement member and a user engagement member, wherein the user engagement member is a curved surface that curves inward with respect to a user, and extends horizontally sufficiently to engage with a substantial portion of a front of the user when attached to the user,
   wherein the device-side engagement member and the user-side engagement member are configured to be secured together with a selected amount of overlap between the device-side engagement member and the user-side engagement member and wherein a height of the user engagement member is greater than any other portion of the attachment.

8. An attachment system for hands-free pushing of a pushable device, the attachment comprising:
   an arm assembly having a device side and a user side and including:
      a push arm connector assembly on the device side, the push arm assembly including a plurality of handle engagement members configured to engage with a handle of the pushable device and a device-side engagement member;
      a user connector assembly on the user side including a user-side engagement member and a user engagement member, wherein the user engagement member includes a user-facing inward curved surface that extends horizontally sufficiently to engage with a substantial portion of a front of the user when attached to the user; and
      a wheel stabilizer system the wheel stabilizer system including:
         a fork engagement member connected to a first side of a fork for a front wheel of the pushable device and to a second side of the fork for the front wheel of the pushable device; and
         a stretchable connector removably attached at a first end to the fork engagement member and at a second end to an inflexible portion of the pushable device
   wherein the device-side engagement member and the user-side engagement member are configured to be secured together with a selected amount of overlap between the device-side engagement member and the user-side engagement member and wherein the fork engagement member is U-shaped and includes a plurality of holes.

9. The attachment system according to claim 8, wherein the user engagement member contacts the user in only one location.

10. The attachment system according to claim 9, wherein the user-side engagement member is operably attached to the user engagement member in only one location.

11. The attachment system according to claim 10, wherein the user-side engagement member and the user engagement member are attached with an attachment plate and wherein the attachment plate provides for vertical motion between the user-side engagement member and the user engagement member.

12. The attachment system according to claim 8, wherein the user-side engagement member includes a slot and the device-side engagement member includes an aperture and wherein the aperture is aligned with the slot when the device-side engagement member and the user-side engagement member are overlapping.

13. The attachment system according to claim 12, further including a securement mechanism, wherein the securement mechanism rigidly secures the selected amount of overlap between the device-side engagement member and the user-side engagement member between the pushable device by engaging the aperture and the slot while allowing slight side to side motion between the device-side engagement member and the user-side engagement member.

14. The attachment system according to claim 13, wherein an upper surface of the device-side engagement member is configured to engage with a lower surface of the user-side engagement member.

* * * * *